United States Patent [19]

Torgerson et al.

[11] Patent Number: 4,582,737
[45] Date of Patent: Apr. 15, 1986

[54] DOUBLE SURFACED ADHESIVE TAPE

[76] Inventors: Gary D. Torgerson; Joyce E. Ferm, both of 3628 Burke Ave. North, Seattle, Wash. 98103

[21] Appl. No.: 692,111

[22] Filed: Jan. 17, 1985

[51] Int. Cl.$^4$ ............................................. B32B 3/06
[52] U.S. Cl. ...................................... 428/57; 156/185; 156/191; 156/524; 427/208; 428/77; 428/172; 428/212; 428/343; 428/354
[58] Field of Search .................... 427/208; 428/57, 77, 428/343, 354, 156, 172, 212, 40; 156/185, 191, 524

[56] References Cited

U.S. PATENT DOCUMENTS

| Re. 19,128 | 4/1934 | Drew | 91/68 |
|---|---|---|---|
| 65,436 | 6/1967 | Rile | 428/156 |
| 2,030,135 | 2/1936 | Carpenter | 428/904.4 |
| 2,387,593 | 10/1945 | Lesser | 117/68.5 |
| 2,565,509 | 8/1951 | Marcin | 428/354 |
| 3,203,823 | 8/1965 | Grimes | 428/198 |
| 3,257,677 | 6/1966 | Batchelder et al. | 428/77 |
| 4,033,803 | 7/1977 | Coder | 427/208 |
| 4,168,196 | 9/1979 | Nemeth et al. | 428/40 |
| 4,273,827 | 6/1981 | Sweeney et al. | 427/208 |
| 4,302,262 | 11/1981 | Kay | 427/208 |

Primary Examiner—George F. Lesmes
Assistant Examiner—P. R. Schwartz
Attorney, Agent, or Firm—Christensen, O'Connor, Johnson & Kindness

[57] ABSTRACT

A double surfaced adhesive tape comprising an elongated strip (14) of flexible material having a longitudinally extending center portion (20) and longitudinally extending first and second edge portions (22, 24). The center portion is thicker than either edge portion, and each edge portion has one adhesively surfaced side (26, 28) and one side (27, 29) that is not surfaced with adhesive. The adhesively surfaced sides may comprise adhesives having different tack properties from one another. The adhesively surfaced sides of the edge portions face in opposite directions from one another. The double surfaced adhesive tape is made by mounting first and second rolls (66, 68) of tape adhesively surfaced on only one side on respective first and second rollers (52, 54), and winding first and second tape strips (70, 72) from the respective rolls onto a rotating core (74) such that the strips are joined together with their adhesively surfaced sides facing one another and overlapping along a portion of their respective widths.

4 Claims, 4 Drawing Figures

DOUBLE SURFACED ADHESIVE TAPE

FIELD OF THE INVENTION

The present invention relates to adhesive tape and, in particular, to a double surfaced adhesive tape and to a method for making a double surfaced adhesive tape.

BACKGROUND OF THE INVENTION

Single surfaced adhesive tape, such as masking tape, is a well-known article of commerce. Such tape is widely used as a mask for painting. For example, when a window frame is to be painted, masking tape may be applied to the window pane immediately adjacent the frame, to prevent paint from inadvertently being applied to the pane.

For some painting operations, such as spray painting, it is frequently necessary to protect or mask an area that is wider than the width of conventional masking tape. When such a requirement exists, it is common to position a sheet of paper, cardboard or the like over the area to be protected, and to position strips of masking tape about the edges of the sheet, such that the masking tape borders the areas to be painted and secures the sheet. Proper positioning of the sheet and masking tape strips can be a comparatively time-consuming process, particularly if the area to be protected is large. It has therefore occasionally been proposed to employ double surfaced adhesive tape to facilitate such operations. Double surfaced adhesive tape is tape that includes adhesive on two sides. When double surfaced adhesive tape is used, the tape is first applied adjacent the areas to be painted using one, inward facing adhesive surface, and a sheet is then placed over and adhered to the outward facing adhesive surface of the tape. However, double surfaced adhesive tape has not achieved widespread use, principally because it generally cannot be formed into a roll without the use of a release liner between adjacent tape layers.

SUMMARY OF THE INVENTION

The present invention provides a double surfaced adhesive tape that can be rolled on itself without the use of a release liner, as well as a method for making such a double surfaced adhesive tape.

In one preferred embodiment, the double surfaced adhesive tape comprises an elongated strip of flexible material having a longitudinally extending center portion and longitudinally extending first and second edge portions. The center portion is thicker than either edge portion. Each edge portion has one adhesively surfaced side and one side that is not surfaced with adhesive. The adhesively surfaced sides of the edge portions face in opposite directions from one another. The elongated strip preferably comprises two single surfaced tapes, each of which comprises an elongated strip of flexible material having one side adhesively surfaced and one side not surfaced with adhesive. The single surfaced tapes are positioned such that their adhesively surfaced sides are joined to one another along portions of their respective widths to form the center portion of the double surfaced adhesive tape. The single surfaced tapes may be selected to have different tack properties from one another.

In another aspect, the present invention provides a method of making a double surfaced adhesive tape. The method comprises mounting first and second rolls of tape adhesively surfaced on only one side on respective first and second rollers, and winding first and second tape strips from the rollers onto a rotating core. The tape strips are wound onto the core such that they are joined together with their adhesively surfaced sides facing one another and overlapping along a portion of their respective widths. A double surfaced adhesive tape is thereby formed that has a double thickness center portion with no adhesively surfaced sides, and first and second edge portions having adhesively surfaced sides facing in opposite directions from one another.

DETAILED DESCRIPTION OF THE INVENTION

Figure 1:
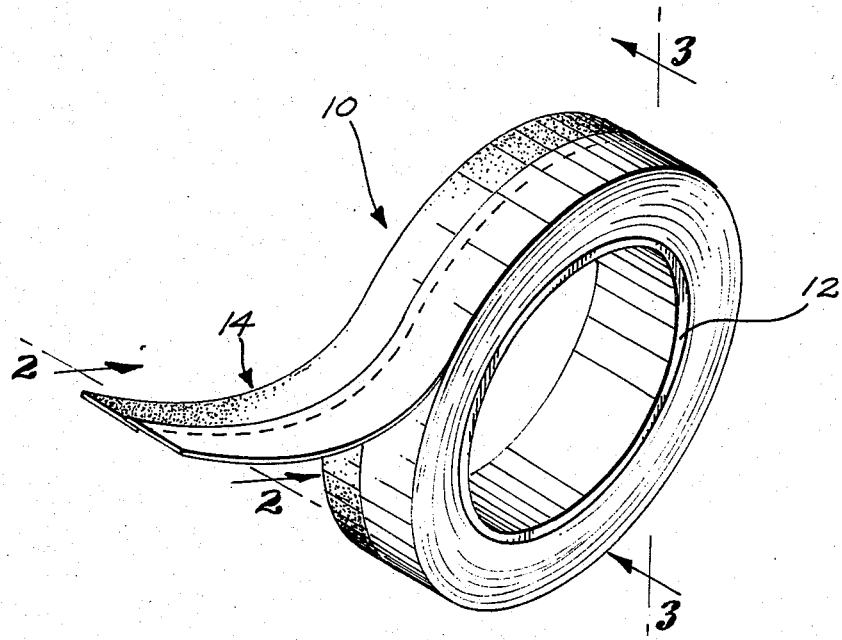
FIG. 1 is a perspective view of a roll of double surfaced adhesive tape according to the present invention.
Figure 2:
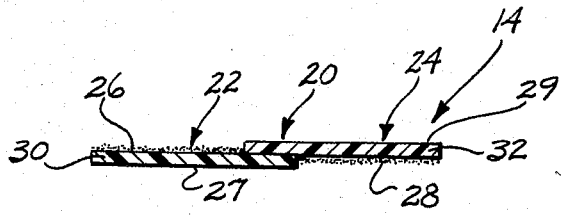
FIG. 2 is a cross-sectional view taken along line 2—2 of FIG. 1.

FIG. 1 illustrates a roll 10 of double surfaced adhesive tape according to the present invention. Roll 10 comprises cylindrical core 12 and elongated strip 14 wound onto core 12. Referring to FIG. 2, strip 14 comprises center portion 20 and edge portions 22 and 24. Edge portion 22 includes upper side 26 that is surfaced with adhesive and lower side 27 that is not surfaced with adhesive. Edge portion 24 includes lower side 28 that is surfaced with adhesive and upper side 29 that is not surfaced with adhesive. Center portion 20 is not adhesively surfaced on either its upper or lower side. Strip 14 is preferably fabricated from a pair of single surfaced adhesive tapes 30 and 32 that have their adhesively surfaced sides facing one another and that are joined together along an overlapping area that comprises center portion 20. The width of center portion 20 should be large enough to ensure the structural integrity of the double surfaced adhesive tape, i.e., to ensure that tapes 30 and 32 remain attached to one another during use of the tape. The width of center portion 20 should also be selected to ensure that the required minimum width is obtained despite variations due to manufacturing tolerances. Increasing the width of center portion 20 beyond that necessary to ensure integrity and to accommodate manufacturing tolerances is generally not preferred, inasmuch as increasing the width of center portion 20 decreases the exposed surface areas of adhesively surfaced sides 26 and 28. For an embodiment in which each tape 30 and 32 comprises a conventional single surfaced masking tape having a width on the order of 0.5-0.75 inches, a width for center portion 20 of approximately 1/32 inches has been found to be suitable.

For certain applications, it is desirable that the adhesive of upper side 26 have different tack properties than the adhesive of lower side 28. For example, when painting a portion of a wall adjacent to a wall portion that includes wallpaper, the wallpapered portion must be masked off prior to painting. However, application of high tack masking tape to wallpaper can result in damage to the wallpaper when the adhesive tape is removed. Therefore, in accordance with the present invention, tape 30 could comprise a low tack or drafting paper tape, such as Scotch No. 203, and tape 32 could comprise a high tack tape, such as Scotch No. 232. Upper side 26 would then be applied to the wallpaper adjacent to the wall portion to be painted, while lower side 28 would be used to secure a suitable sheet covering material to the wallpapered portion.

Figure 3:
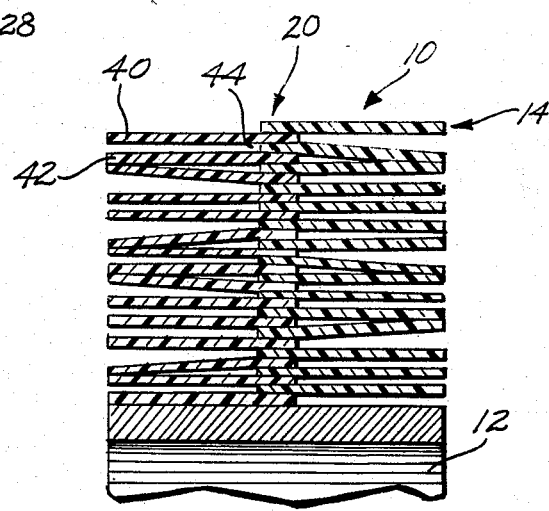
FIG. 3 is a cross-sectional view taken along line 3—3 of FIG. 1.

Referring now to FIG. 3, and in particular to edge portions 40 and 42, it may be appreciated that when strip 14 is wound upon itself to produce roll 10, adjacent edge portions such as edge portions 40 and 42 will have only a single layer of adhesive along their area of contact. For example, referring to FIGS. 2 and 3, each edge portion 40 and 42 will be adhesively surfaced only on its upper side, and the contact between the lower side of edge portion 40 and the upper side of edge portion 42 will therefore include only a single adhesive layer. Furthermore, center portion 20 has a thickness that is greater than the thickness of either edge portion. As a result, gaps such as gap 44 will exist between adjacent edge portions over an appreciable area of such edge portions. Gaps 44 reduce the area of contact between adjacent edge portions. As a result, the tape of the present invention can be drawn from roll 10 without the use of undue force and without damage to the tape.

Figure 4:
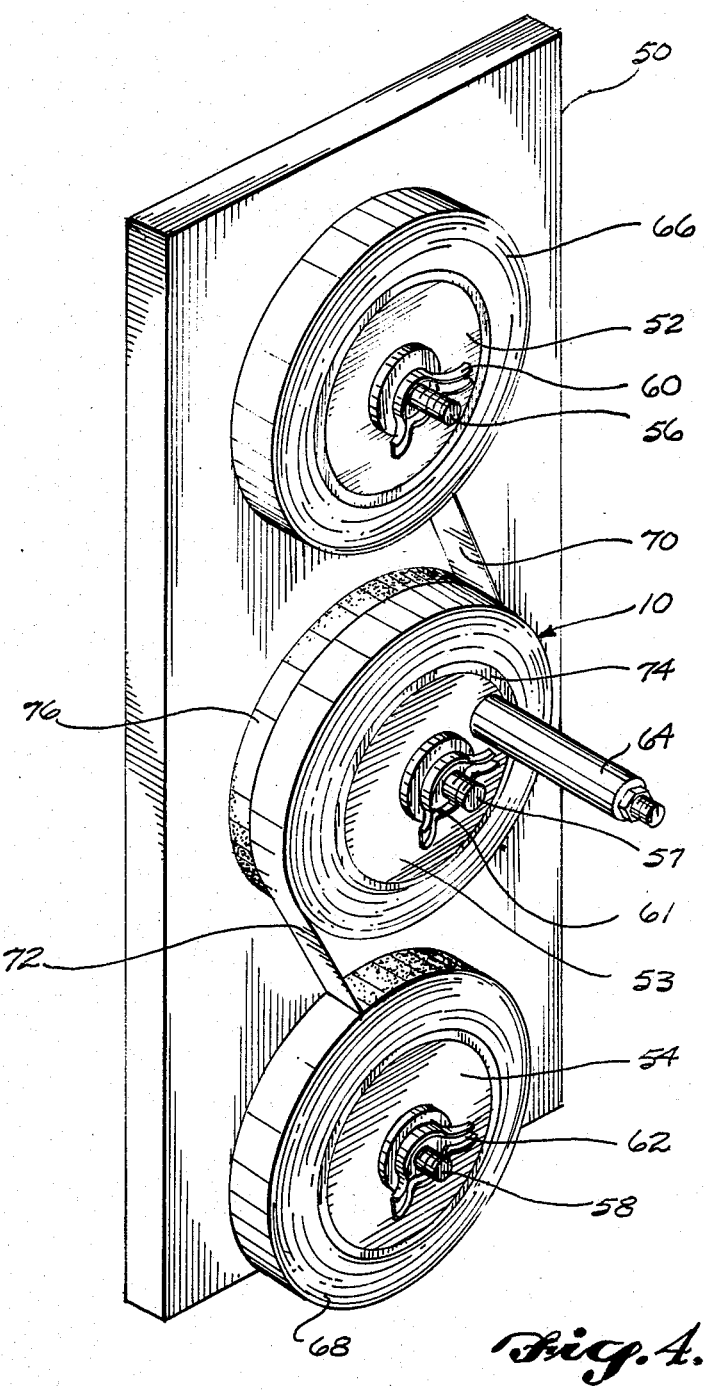
FIG. 4 illustrates a method and apparatus for making the masking tape of FIGS. 1-3.

FIG. 4 illustrates a method and apparatus for producing roll 10 of FIG. 1. The apparatus of FIG. 4 comprises support 50 upon which rollers 52-54 are rotatably mounted by shafts 56-58 and nuts 60-62. Roller 53 includes handle 64 that may be used by an operator to rotate the roller. In operation, a first roll 66 of conventional single surfaced masking tape is mounted on roller 52, and a second roll 68 of conventional single surfaced masking tape is mounted on roller 54. A spacer (not shown) may be employed behind roll 68 to position the roll a short distance outward from support 50. Core 74 is then positioned on roller 53, and tape strips 70 and 72 from rolls 66 and 68 respectively are attached to core 74 in the offset and facing relationship indicated in FIG. 2. For example, strip 70 can be positioned on core 74 such that adhesively surfaced side 76 of strip 70 faces outward from core 74, in which case strip 72 would be applied to core 74 with its adhesively surfaced side facing inward. Roller 53 is then rotated by means of handle 64, to draw strips 70 and 72 onto roller 53 and thereby produce roll 10. Means other than handle 64 could, of course, be provided for rotating roller 53. For some applications, it may also be desirable to provide guide means for strips 70 and 72 to assure uniform overlap of the individual tapes.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is defined are as follows:

We claim:

1. A double surfaced adhesive tape comprising two single surfaced tapes, each single surfaced tape comprising an elongated strip of flexible material having one side adhesively surfaced and one side not surfaced with adhesive, the single surfaced tapes being positioned such that their adhesively surfaced sides are joined to one another along portions of their respective widths to form a longitudinally extending center portion and longitudinally extending first and second edge portions, whereby the center portion is thicker than either edge portion and not adhesively surfaced on either side thereof, each edge portion has one adhesively surfaced side and one side not surfaced with adhesive, and the adhesively surfaced sides of the edge portions face in opposite directions from one another.

2. The double surfaced adhesive tape of claim 1, wherein the thicknesses of the edge portions are approximately equal to one another, and wherein the thickness of the center portion is approximately twice the thickness of the edge portions.

3. The double surfaced adhesive tape of claim 1, wherein the adhesively surfaced side of one single surfaced tape comprises an adhesive that has different tack properties than the adhesively surfaced side of the other single surfaced tape.

4. A method of making a double surfaced adhesive tape, comprising:

mounting first and second rolls of tape adhesively surfaced on only one side on respective first and second rollers; and unwinding first and second tape strips from the first and second rolls respectively onto a rotating member such that the first and second tape strips on the rotating member are joined together with their adhesively surfaced sides facing one another and overlapping along a portion of their respective widths, to thereby form a double surfaced adhesive tape having a center portion with no adhesively surfaced sides and first and second edge portions having adhesively surfaced sides facing in opposite directions from one another, the center portion being thicker than either edge portion.

* * * * *